US012724649B2

(12) United States Patent
Chanler et al.

(10) Patent No.: US 12,724,649 B2
(45) Date of Patent: Sep. 1, 2026

(54) DISTRIBUTED CLUSTER JOIN MANAGEMENT

(71) Applicant: Dell Products, L.P., Hopkinton, MA (US)

(72) Inventors: Andrew Chanler, Berlin, MA (US); Kevin Tobin, Hopedale, MA (US); Mathew J. Pilozzi, Plainville, MA (US)

(73) Assignee: Dell Products, L.P., Hopkinton, MA (US)

( * ) Notice: Subject to any disclaimer, the term of this patent is extended or adjusted under 35 U.S.C. 154(b) by 901 days.

(21) Appl. No.: 17/956,944

(22) Filed: Sep. 30, 2022

(65) Prior Publication Data

US 2024/0111606 A1 Apr. 4, 2024

(51) Int. Cl.
*G06F 9/50* (2006.01)

(52) U.S. Cl.
CPC .......... *G06F 9/5083* (2013.01); *G06F 9/5016* (2013.01)

(58) Field of Classification Search
CPC ............................ G06F 9/5083; G06F 9/5016
See application file for complete search history.

(56) References Cited

U.S. PATENT DOCUMENTS 6,965,957 B1 * 11/2005 Nguyen ................ G06F 9/5061 710/123
2004/0210656 A1 * 10/2004 Beck ....................... H04L 69/40 709/225
2017/0230349 A1 * 8/2017 Gaur ..................... G06F 21/629
2023/0273739 A1 * 8/2023 Van Alstyne ......... G06F 3/0604 711/154

* cited by examiner

*Primary Examiner* — April Y Blair
(74) *Attorney, Agent, or Firm* — Anderson Gorecki LLP

(57) ABSTRACT

Nodes of the cluster receive workload tasks and use a striping algorithm to determine which node in the cluster should process the workload tasks. Workload task allocation within the cluster is dependent on the cluster membership at the time the striping algorithm is implemented. If a node leaves the cluster, the cluster membership is updated, and the striping algorithm is used to reallocate workload tasks assigned to the leaving node to other nodes within the cluster. If a node joins the cluster, cluster membership is updated, and any workload tasks previously assigned to the cluster nodes are allowed to complete before the joining node is able to begin working on workload tasks. Cluster membership changes are updated in a shared global memory, and locally synchronized in connection with particular events, to implement the distributed cluster join management process.

20 Claims, 10 Drawing Sheets

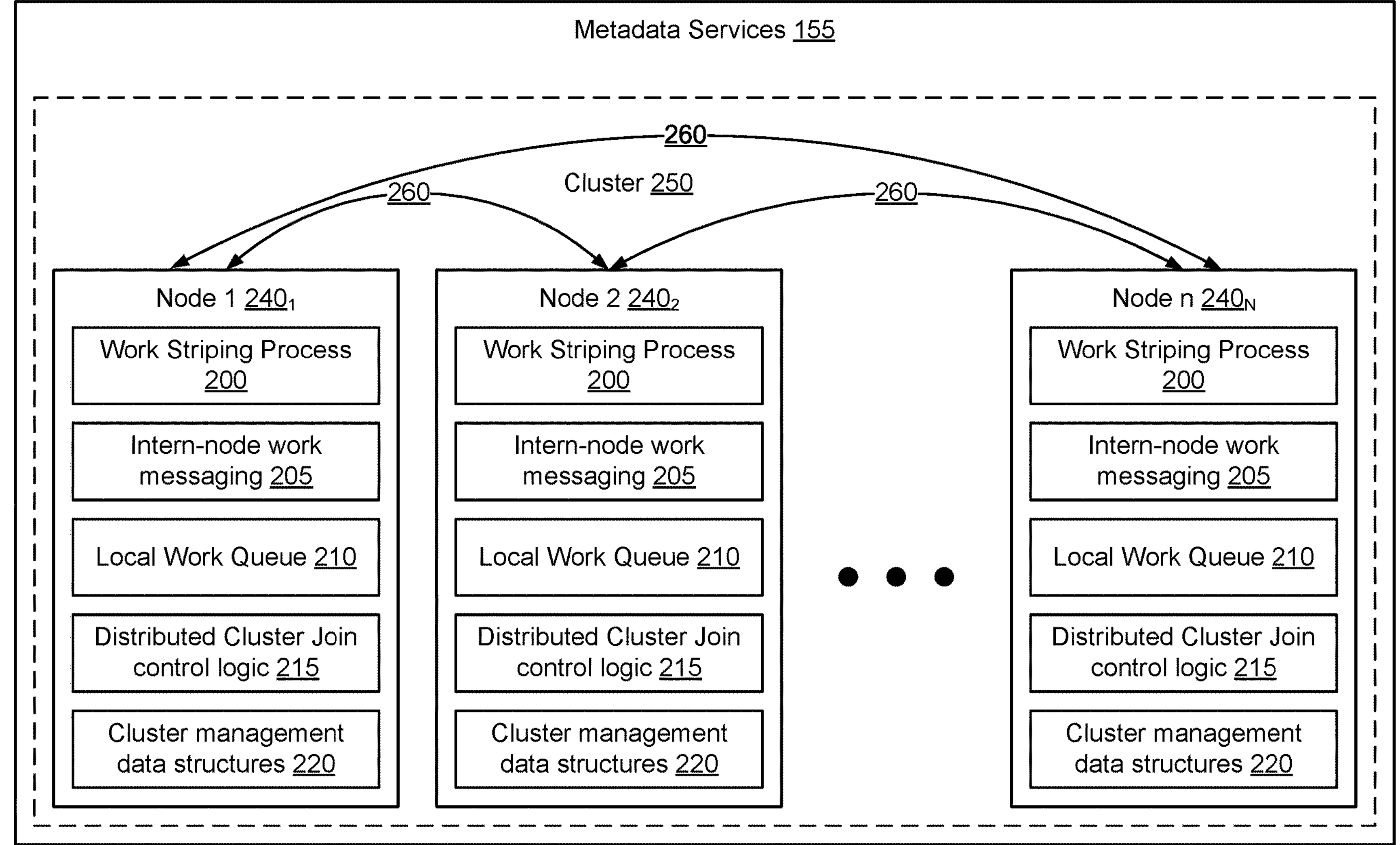
FIG. 2
Metadata Services 155
260
Cluster 250
260
260
Node 1 $240_1$
Work Striping Process 200
Intern-node work messaging 205
Local Work Queue 210
Distributed Cluster Join control logic 215
Cluster management data structures 220
Node 2 $240_2$
Work Striping Process 200
Intern-node work messaging 205
Local Work Queue 210
Distributed Cluster Join control logic 215
Cluster management data structures 220
Node n $240_N$
Work Striping Process 200
Intern-node work messaging 205
Local Work Queue 210
Distributed Cluster Join control logic 215
Cluster management data structures 220

FIG. 3

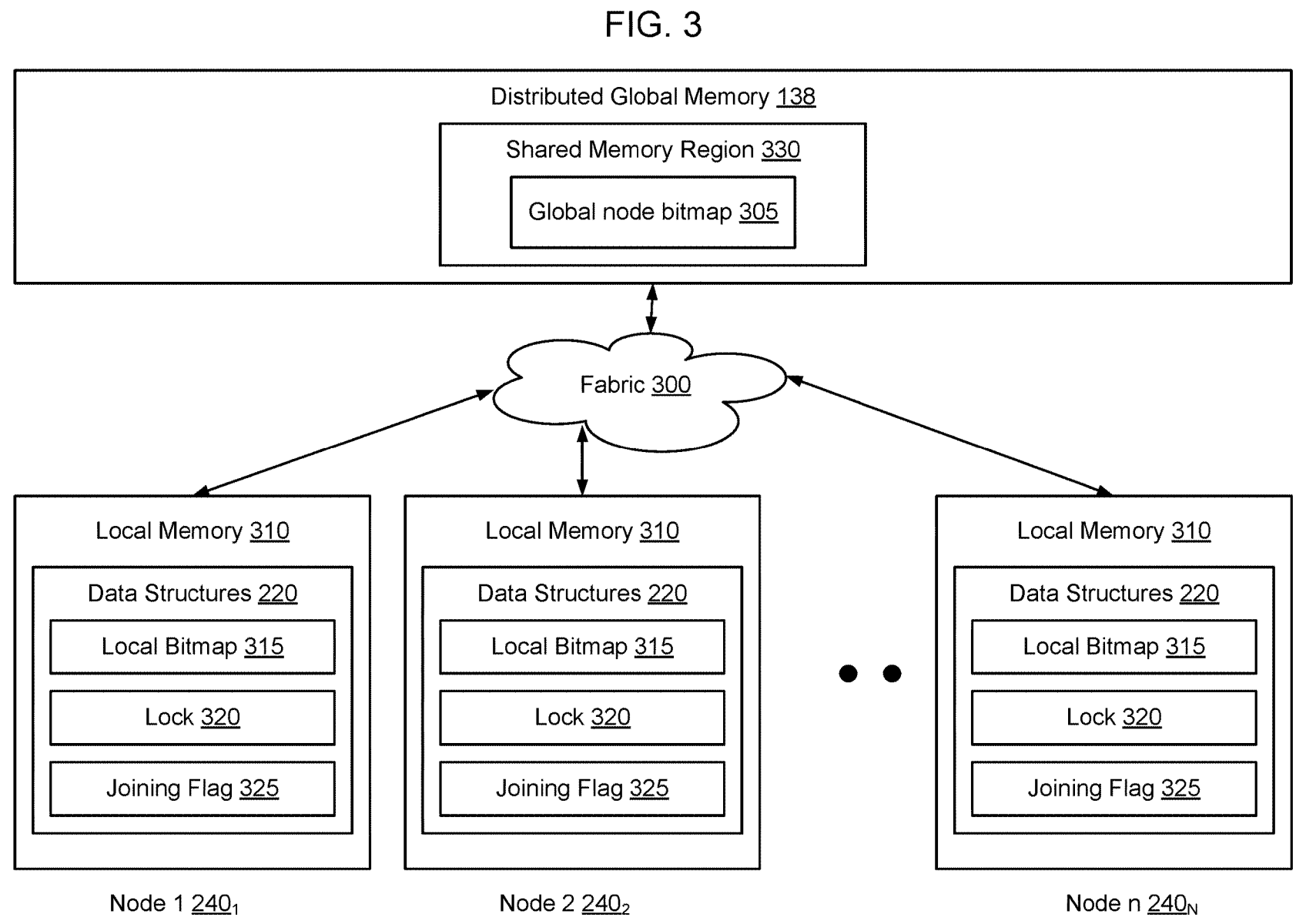

Distributed Global Memory 138

Shared Memory Region 330

Global node bitmap 305

Fabric 300

Local Memory 310

Data Structures 220

Local Bitmap 315

Lock 320

Joining Flag 325

Node 1 $240_1$

Local Memory 310

Data Structures 220

Local Bitmap 315

Lock 320

Joining Flag 325

Node 2 $240_2$

Local Memory 310

Data Structures 220

Local Bitmap 315

Lock 320

Joining Flag 325

Node n $240_N$

FIG. 4

Work Striping across nodes in bitmap

```
stripe_work(work_index, stripe_width, seed, node_bitmap, node_count)   400
{
        offset=(work_index/stripe_width)+seed;   405
        for (divisor = node_count; divisor>0; divisor--)   410
        {
                node=offset%divisor;   415
                if(BIT_is_set(node, node_bitmap))   420
                {
                        return node;   425
                }
        }
        return -1;   430
}
```

Join Cluster
600
Local.joining=true
605
Atomic set self in global bitmap
610
Send fence-work-request to other nodes
620
Receive Fence-Work-ACK message from other node
615
Receive all work-fence-ack?
True
False
625
Local.joinng=false
630
Run "update local bitmap algorithm" (FIG. 5)
End Execute Fence Work Request
800
Is Fence-Task at head of work queue?
False
True
805
Send Fence-Work-ACK
End Receive Fence Work Request
700
Receive Fence-request message
705
Run "update local bitmap algorithm" (FIG. 5)
710
Create fence task in local work queue Receive Update Request
1100
Receive Update Request message
1105
Run "update local bitmap algorithm" (FIG. 5)
End Leave Cluster
1000
Atomic clear bit in global bitmap
1005
Send Update-Request message to other nodes
1010
Run "update local bitmap algorithm" (FIG. 5)
End

FIG. 12

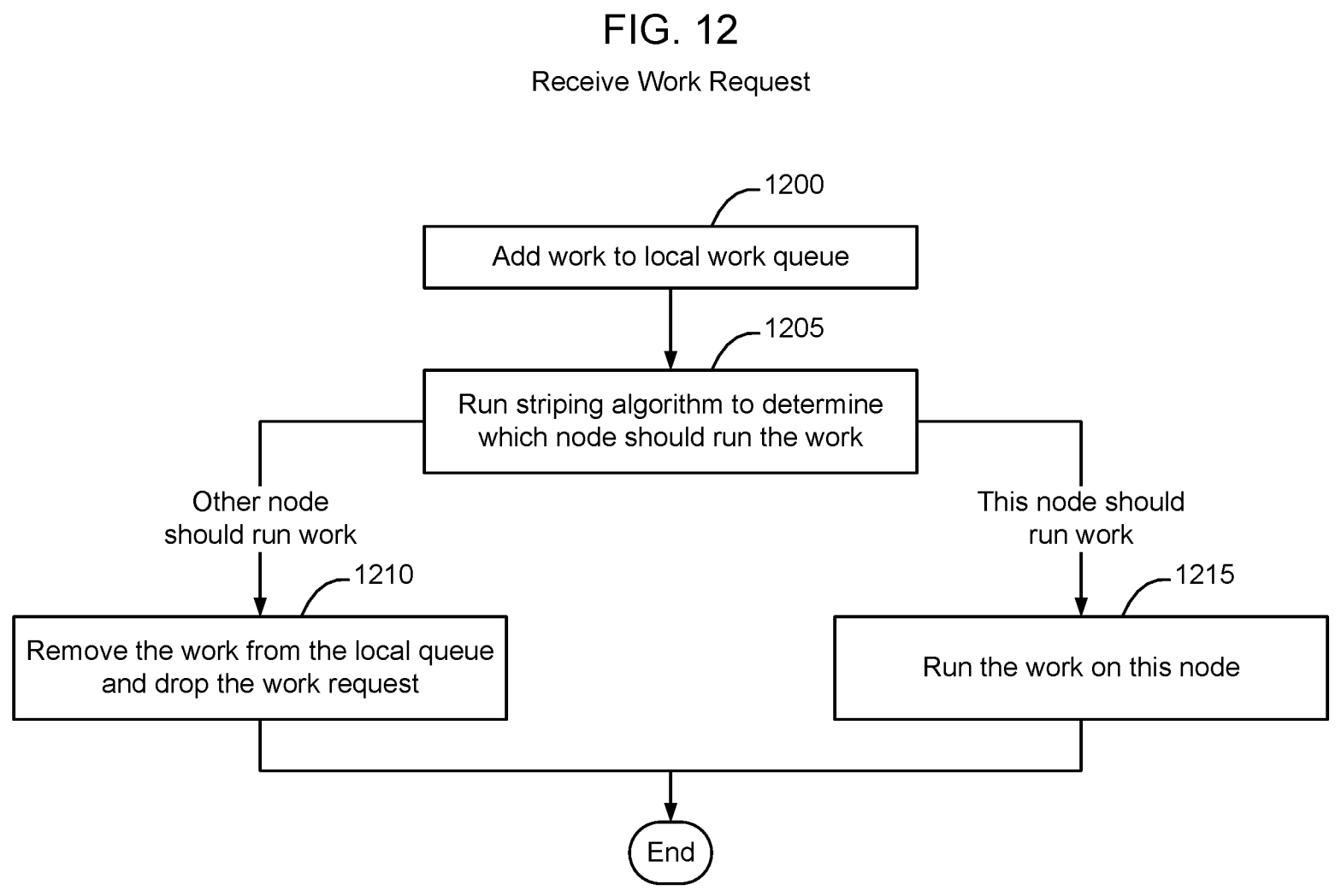

Receive Work Request

1200 Add work to local work queue

1205 Run striping algorithm to determine which node should run the work

This node should run work

1215 Run the work on this node

Other node should run work

1210 Remove the work from the local queue and drop the work request

End

DISTRIBUTED CLUSTER JOIN MANAGEMENT

FIELD

This disclosure relates to computing systems and related devices and methods, and, more particularly, to a method and apparatus for enabling a node to join an existing cluster of nodes sharing workload tasks in a storage system.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

It is possible to form a "cluster" of two or more processing nodes that collectively are responsible for performing a particular type of work (a set of workload tasks) on a storage system, and which share the workload tasks between each other in connection with completion of the particular type of work on the storage system. For ease of reference, processing nodes that are configured to participate in a cluster are also referred to herein as "nodes".

In some embodiments, when a workload task arrives at one of the nodes of the cluster, the node uses a striping process to deterministically allocate the workload task to one of the nodes of the cluster. If the node that received the workload task is determined via the striping process to not be the node that should be responsible for the workload task, the node that received the workload task will message the workload task to one of the other node, to cause the workload task to be provided to the correct node of the cluster. In this manner, workload tasks are able to be received by any node of the cluster, and collectively workload tasks are able to be distributed between the nodes of the cluster in a deterministic manner.

When a node fails, the node's workload tasks are redistributed across the cluster to other nodes of the cluster. When a node is recovered, or if a new node is added to the cluster, the current nodes of the cluster might be processing workload tasks that could be restriped to the joining node if the work tasks are not completed sufficiently quickly. For example, if a first node sends a workload task to a second node, and the workload task is not completed within a given time-frame, in some embodiments the first node will re-run the striping algorithm and re-send the same workload task. If the node membership of the cluster has changed between the time when the workload task was first sent out and the time when the workload task was re-sent, it is possible that the striping algorithm used by the first node (which is dependent on cluster membership) might cause the work request to be sent to the new node instead of to the second node. This can result in two nodes of the cluster (the second node and the newly joined node in this example) attempting to execute the same workload task at the same time, which can cause problems within the cluster.

According to some embodiments, a method and apparatus for enabling a node to join an existing cluster of nodes sharing workload tasks in a storage system is provided. Nodes of the cluster receive workload tasks and use a striping algorithm to determine which node in the cluster should process the workload tasks. Workload task allocation within the cluster is dependent on the cluster membership at the time the striping algorithm is implemented. If a node leaves the cluster, the cluster membership is updated, and the striping algorithm is used to reallocate workload tasks assigned to the leaving node to other nodes within the cluster. If a node joins the cluster, cluster membership is updated, and any workload tasks previously assigned to the cluster nodes are allowed to complete before the joining node is able to accept workload tasks. By implementing a distributed cluster join management process that prevents the joining node from accepting previously allocated workload tasks, it is possible to enable nodes to dynamically leave and join a cluster while ensuring that workload tasks are not able to be allocated to more than one cluster node for processing during the joining process. In some embodiments, the distributed cluster join management process is used in the context of cluster of nodes configured to implement a metadata services subsystem of a storage system, although the distributed join management process can be used in other contexts as well.

BRIEF DESCRIPTION OF THE DRAWINGS

FIG. 2 is a functional block diagram of an example cluster of nodes configured to share workload tasks in a storage system, according to some embodiments.

FIG. 3 is a functional block diagram of a set of data structures used by cluster nodes and configured to enable a node to join an existing cluster of nodes using a distributed join management process, according to some embodiments.

FIG. 4 is a functional block diagram containing pseudocode of an example work striping process for use in the cluster of nodes to enable each node of the cluster of nodes to deterministically assign workload tasks, according to some embodiments.

FIG. 12 is a flow chart of an example process implemented each time a node receives a workload request, according to some embodiments.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
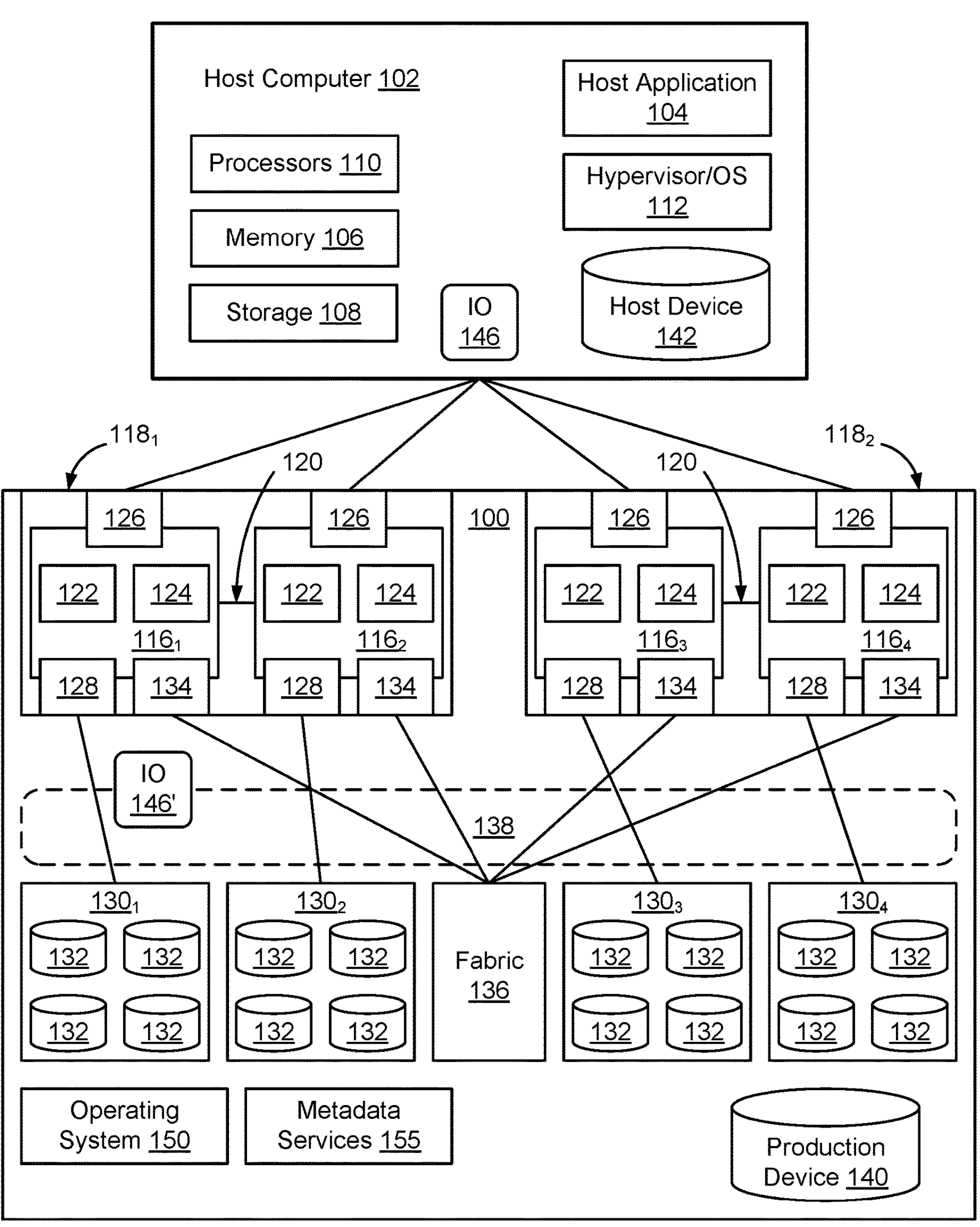
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $\mathbf{116}_1$-$\mathbf{116}_4$, possibly including but not limited to storage servers and specially designed compute engines or storage directors for providing data storage services. In some embodiments, pairs of the compute nodes, e.g. ($\mathbf{116}_1$-$\mathbf{116}_2$) and ($\mathbf{116}_3$-$\mathbf{116}_4$), are organized as storage engines $\mathbf{118}_1$ and $\mathbf{118}_2$, respectively, for purposes of facilitating failover between compute nodes 116 within storage system 100. In some embodiments, the paired compute nodes 116 of each storage engine 118 are directly interconnected by communication links 120. As used herein, the term "storage engine" will refer to a storage engine, such as storage engines $\mathbf{118}_1$ and $\mathbf{118}_2$, which has a pair of (two independent) compute nodes, e.g. ($\mathbf{116}_1$-$\mathbf{116}_2$) or ($\mathbf{116}_3$-$\mathbf{116}_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $\mathbf{116}_1$, $\mathbf{116}_2$, $\mathbf{116}_3$, $\mathbf{116}_4$, includes processors 122 and a local memory 124. The processors 122 may include a plurality of multi-core processors of one or more types, e.g., including multiple CPUs, GPUs, and combinations thereof. The local memory 124 may include, for example and without limitation, any type of volatile memory such as RAM, and may also include memory implemented using persistent memory (PMEM) technology. Each compute node 116 may also include one or more front-end adapters 126 for communicating with the host computer 102. Each compute node $\mathbf{116}_1$-$\mathbf{116}_4$ may also include one or more back-end adapters 128 for communicating with respective associated back-end drive arrays $\mathbf{130}_1$-$\mathbf{130}_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $\mathbf{116}_1$-$\mathbf{116}_4$, using a PCIe (Peripheral Component Interconnect Express) bus or may be connected to the compute nodes $\mathbf{116}_1$-$\mathbf{116}_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using InfiniBand. Each compute node 116 may allocate a portion or partition of its respective local volatile memory 124 to a virtual shared "global" memory 138 that can be accessed by other compute nodes 116, e.g., via DMA (Direct Memory Access) or RDMA (Remote Direct Memory Access). Shared global memory 138 will also be referred to herein as the cache of the storage system 100.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared global memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared global memory 138 or on managed drives 132. If the commanded data is not in the virtual shared global memory 138, then the data is temporarily copied into the virtual shared global memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared global memory 138, marks the data as dirty, and creates new metadata that maps the address of the data on the production device 140 to a location to which the block is written on the managed drives 132.

It is possible to form a "cluster" of two or more nodes that collectively are responsible for performing a particular type of work (a set of workload tasks) on a storage system. As used herein, the term "cluster" is used to refer to two or more nodes that collectively are responsible for performing a particular type of work on a storage system, and which share the workload tasks between each other in connection with completion of the particular type of work on the storage system. Example nodes might be implemented, for example, using processes executing on the compute nodes 116 of storage system 100. The processes might be implemented on each of the compute nodes 116 or on a subset of the compute nodes 116 depending on the implementation. Example processes might be implemented using virtual machines executing as emulations on the resources of the compute nodes 116 or executing in containers instantiated on the compute nodes 116.

When a cluster of two or more nodes is created, it is advantageous to cause the work assigned to the cluster to be distributed between the nodes to prevent one or more of the nodes from being overloaded. Accordingly, in some embodiments, to attempt to prevent all workload tasks from being allocated to a particular node of the cluster, when a workload task arrives at one of the nodes of the cluster, the node uses a striping process to deterministically allocate the workload task to one of the nodes of the cluster. For example, a particular node of the cluster might receive a disproportionate number of workload tasks and, without striping the workload tasks between the nodes, might be overloaded. Accordingly, in some embodiments, when a node receives a workload task, the node will add the workload task to its local workload queue, and then run a striping algorithm to determine if it is responsible for implementing the workload task, or if another node is responsible for implementing the workload task. In instances where the node determines that it is responsible, the workload task is run by the node. In instances where the node determines that another node is responsible for the workload task, the node that received the workload task will remove the workload task from its local workload queue, and message the workload task to the other node to cause the workload task to be provided to the correct node of the cluster. In this manner, workload tasks are able to be received by any node of the cluster, and collectively workload tasks are able to be distributed between the nodes of the cluster in a deterministic manner.

When a node uses the striping algorithm to determine which node of the cluster should be responsible for a particular workload task, the striping algorithm will determine the responsible node based on the current cluster membership. If a node leaves the cluster, the cluster membership is updated, and the striping algorithm is used to reallocate workload tasks assigned to the leaving node to other nodes within the cluster. If a node joins the cluster, according to some embodiments, a distributed cluster join management process is used to update the cluster membership, and cause any workload tasks previously assigned to the cluster nodes to be completed before the joining node is able to process workload tasks. By implementing a distributed cluster join management process that causes all previously allocated workload tasks to complete before the joining node is able to process workload tasks, it is possible to enable nodes to dynamically leave and join a cluster while ensuring that workload tasks are not able to be executed by more than one cluster node for processing during the joining process.

In some embodiments, the distributed cluster join management process is used in the context of a metadata services subsystem of a storage system. For example, as shown in FIG. 1, in some embodiments the storage system 100 includes a metadata services subsystem 155 configured to manage the metadata created and consumed by the other processing resources of the storage system. For example, as noted above, IO operations can result in generation or modification of metadata on the storage system. In some embodiments, the storage system implements these types of operations using the metadata services subsystem 155. Whenever metadata is created, modified, or deleted, workload tasks are sent to the metadata services subsystem to instruct the metadata services subsystem to implement the requested operations on the metadata maintained by the storage system.

In some embodiments, the metadata services subsystem 155 is implemented using a cluster 250 of nodes 240, in which each node 240 participates as a node in the cluster 250. As workload tasks are received by the metadata services subsystem 155, the workload tasks are deterministically allocated for processing by one of the nodes of the cluster using a striping algorithm. Nodes 240 can be added to the cluster 250, for example in connection with expansion events, and can also be removed from the cluster 250 temporarily, for example in connection with failure events or upgrade/maintenance events. As the cluster membership changes, a distributed cluster join management process is implemented that is configured to ensure that workload tasks are not able to be allocated to more than one cluster node for processing. Although some embodiments of the distributed cluster join management process will be described using a metadata services subsystem as a reference system, it should be understood that the distributed cluster join management process can be used in other contexts as well.

FIG. 2 is a functional block diagram of an example cluster 250 of nodes 240 configured to share workload tasks in a storage system, according to some embodiments. As shown in FIG. 2, in some embodiments the cluster includes a plurality of nodes $\mathbf{240}_1$-$\mathbf{240}_N$. Each node 240 receives workload requests from other processes executing on the storage system 100, adds the workload requests to their local workload queue, and uses a work striping process 200 to determine which active node 240 of the cluster 250 (dashed box in FIG. 2) should process the particular workload request. An example workload queue is described in greater detail in connection with FIGS. 9A-9C. An example work striping process 200 is described in greater detail in connection with FIG. 4.

Where a node 240 determines that it should process the particular workload request, the node 240 processes the workload request. Where the node 240 determines that another node should process the workload request, it sends (arrows 260) the workload request to the node identified using the work striping process 200 and removes the work from the local workload queue. When the other node receives the workload request, adds the workload request to its local workload queue, locally runs the striping algorithm to determine if it is responsible for the workload request, and if the receiving node determines that it is responsible for the workload request, it processes the workload request. In some embodiments, the node includes an inter-node work messaging system 205 to enable workload requests to be sent between nodes of the cluster.

FIG. 12 shows an example process implemented each time a node receives a workload request. Specifically, as shown in FIG. 12 in some embodiments when a node receives a workload request, the node adds the work to the local workload queue (block 1200) before running the striping algorithm on the workload request (block 1205). If the node runs the striping algorithm and determines that another node should run the work the node removes the work from its local queue and drops the work request (block 1210). If the node runs the striping algorithm and determines that it should run the work, the work item remains in the node's local workload queue and the node will run the work (block 1215). By adding the workload request to the queue prior to running the striping algorithm on the workload item, it is possible to ensure that all work that arrives after a fence task will use the updated bitmap in connection with implementation of the striping algorithm.

In some embodiments, if each node 240 implements the same workload striping process 200 using the same cluster membership information, each node 240 should arrive at the same determination of which node should handle any given workload request. Accordingly, maintaining consistent cluster membership information between the nodes 240, when the cluster membership changes, is important to prevent workload requests from being misassigned within the workload cluster. According to some embodiments, each node includes distributed cluster join control logic 215 configured to enable the nodes to maintain consistent cluster membership information. Example distributed cluster join control logic 215 is described in greater detail in connection with FIGS. 5-11. In some embodiments, the distributed cluster join control logic 215 maintains cluster management data structures 220 that are described in greater detail in connection with FIG. 3.

FIG. 3 is a functional block diagram of a set of data structures used by cluster nodes and configured to enable a node to join an existing cluster 250 of nodes 240 using a distributed join management process, according to some embodiments. As shown in FIG. 3, in some embodiments the cluster is formed using a cluster 250 of nodes 240 that are connected by fabric 300 to the distributed global memory 138. The distributed global memory 138 provides a memory region 330 that is visible to all nodes in the cluster. In some embodiments, a shared memory region 330 of distributed global memory 138 is provided to store current cluster membership information which, in FIG. 3, is illustrated as being implemented using a global cluster membership bitmap 305. Although some embodiments are described in which the current cluster membership information is maintained using a bitmap data structure, it should be understood that other types of data structures can be used to maintain the current cluster membership information in distributed global memory 138. In embodiments where the current cluster membership information is implemented using a bitmap, each node of the cluster may be represented by a bit in the bitmap. If the bit associated with a given node is a first value (e.g., 1), the node is currently active in the cluster and is available to be assigned workload tasks on the storage system. If the bit associated with the given node is a second value (e.g., 0), the node is not currently active in the cluster and is not available to be assigned workload tasks on the storage system.

Each node has a local memory 310 that it uses to store one or more cluster management data structures 220. In some embodiments, the cluster management data structures 220 include a local version of the current cluster membership information. In some embodiments the local version of the current cluster membership information is implemented as a local cluster membership bitmap 315. Although some embodiments are described in which the current cluster membership information is locally maintained by each of the nodes using a bitmap data structure, it should be understood that other types of data structures can be used to maintain the current cluster membership information in local memory 310. The manner in which the local cluster membership bitmap 315 is synchronized with the current cluster membership information 305 in distributed memory 138 is described in greater detail in connection with FIGS. 5-11.

In some embodiments the local memory 310 also includes a lock 320 and a joining flag 325 that may be implemented as a Boolean value (e.g., a binary value that is either true or false). The lock 320 is used, in some embodiments, where the node 240 might include multiple threads, and is implemented to ensure that only one thread executing on a given node is used to update the local cluster membership bitmap 315 (see FIG. 5) in connection with the distributed cluster join management process. The joining flag 325 is used to enable the node to be held in a "joining" state to enable all nodes to synchronize their local view (local bitmap 315) of the current cluster membership (global cluster membership bitmap 305) in connection with particular cluster membership change operations associated with the distributed cluster join management process.

FIG. 4 is a functional block diagram containing pseudocode of an example work striping process for use in the cluster of nodes to enable each node of the cluster of nodes to deterministically assign workload tasks, according to some embodiments. As shown in FIG. 4, in some embodiments the work striping process (line 400) takes the following arguments and uses the following arguments to deterministically resolve which active node of a cluster should be selected to handle a particular workload request:

- Argument 1—Work_index: The work index identifies a particular piece of metadata associated with a particular workload task within an enumeration of every possible piece of metadata. Depending on the implementation, the work index may have multiple fields, such as the metadata type, number, instance, etc. The particular work_index will depend on the particular manner in which metadata is organized and identified within the storage system.
- Argument 2—Stripe_width: The stripe width is the size of a range of enumerated metadata values that are to be assigned to a given node. For example, if the stripe width is 32, 32 consecutive metadata values would be commonly assigned to a given node. Using a stripe_width greater than 1 enables defined ranges of enumerated metadata values to be assigned to a given node, such that any time a work request on one of the metadata values within the range occurs, that work request will be assigned to the given node.
- Argument 3—Seed: The seed value is a value that is used to help distribute work between the nodes of the cluster. If work requests are always distributed starting at the same starting point, it might be possible for a given node to be overloaded. However, if a seed value is used, such as the number of the Thin Device (TDEV) associated with the metadata, it is possible to rotate the starting point within cluster such that the workload is more likely to be more evenly distributed between the nodes.
- Argument 4—node_bitmap: The node bitmap is the local cluster membership bitmap 315.
- Argument 5—Node_Count: The node count is the total number of nodes in the cluster, regardless of the current status of one or more of the nodes.

For example, if the cluster has four nodes the Node_Count will be set to be equal to four. If one node is currently in a failed state and not available to process work requests, the Node_Count will still be set to "4" in the stripe_work process. If the number of nodes in the cluster is increased to six, for example in connection with an expansion event where an additional pair of nodes 240 is added to the storage system, the Node_Count will be increased to "6" to reflect this change.

As shown in FIG. 4, in some embodiments when a work requests arrives, the stripe_work process determines an offset equal to the work_index divided by the work stripe, plus the seed value (line 405). The stripe_work process then attempts to stripe the work request across all nodes of the cluster (line 410), and determines the value of the node that should be used to implement the work request using the offset and the divisor: node=offset % divisor (line 415). Selection of a node at line 415 does not take into account whether or not the selected node is currently active in the cluster.

The stripe_work process then determines if the node identified in line 415 is active in the cluster using the local cluster membership bitmap 315. If the bit is set in the local cluster membership bitmap 315 for the node indicating that the node is active in the cluster (line 420), the work request is assigned to the node: return node (line 425).

If the node that is determined using the process at line 415 is determined at line 420 to not be currently active in the cluster, the bit for the selected node will not be set. Accordingly, the loop returns −1 instead of the node ID, which causes the divisor to be reduced by 1 and the process repeats (node=offset % divisor: line 415) with a lower divisor based on the determined reduced number of nodes. For example, assume that a cluster has 6 nodes, but that one of the nodes is currently not active. The stripe_work process will initially attempt to stripe work across the nodes using a divisor of 6. If the non-active node is identified to be assigned a particular work request, the work striping process will determine from the node_bitmap at line 420 that the node selected at line 415 is not active. The loop will then decrement the divisor by 1 and attempt to stripe the work using a divisor of 5. It is possible that the same non-active node or another non-active node might be selected at line 415 using the reduced divisor. In some embodiments this process will continue until a node that is active in the cluster is able to be located by the work striping process.

Figure 5:
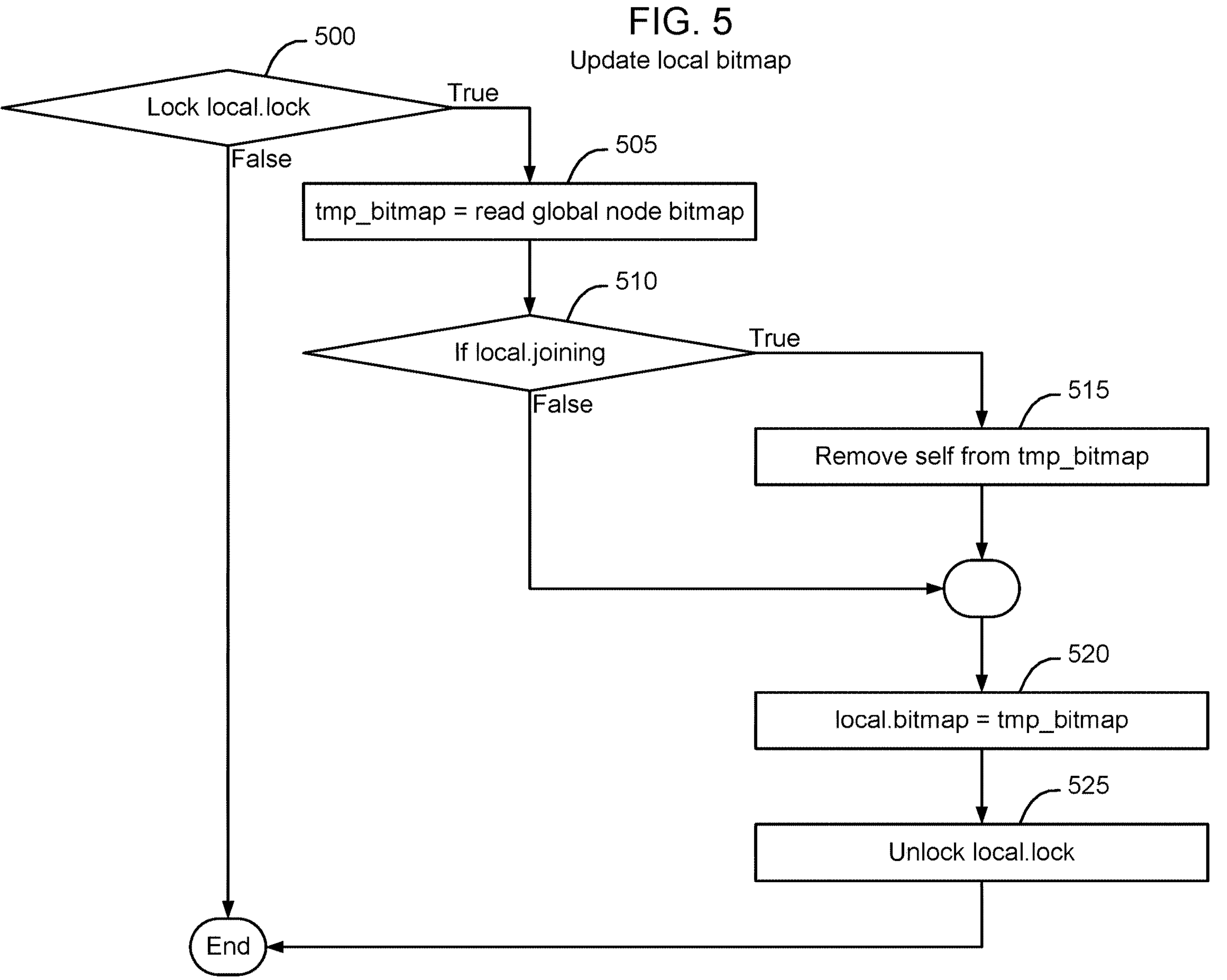
FIG. 5 is a flow chart of a process used by the cluster nodes to update local cluster membership data structures that are used by the cluster nodes in connection with implementation of the distributed join management process and used by the cluster nodes in connection with the striping algorithm of FIG. 4 to assign workload tasks, according to some embodiments.

FIG. 5 is a flow chart of a process used by the cluster nodes to update local cluster membership data structures that are used by the cluster nodes in connection with implementation of the distributed join management process and used by the cluster nodes in connection with the striping algorithm of FIG. 4 to assign workload tasks, according to some embodiments. As shown in FIG. 5, in some embodiments each node locally uses a process to synchronize its local cluster membership bitmap 315 with the global cluster membership bitmap 305 in connection with the distributed global join management process.

The process shown in FIG. 5 is used, for example, when a node is first joined to the cluster and is used to initialize the local cluster membership bitmap 315 on the node. The process shown in FIG. 5 is also used by the joining node a second time at the end of the joining process described in connection with FIG. 6. The process shown in FIG. 5 is also used by the nodes of the cluster in response to receipt of an update request message, for example when one of the other nodes requests that the other nodes update their local cluster membership bitmaps 315. The process shown in FIG. 5 can also be run periodically by the nodes, for example to ensure that the node's version of the local cluster membership bitmap 315 is consistent with the global cluster membership bitmap 305.

As shown in FIG. 5, in some embodiments, if a determination is made to synchronize the local cluster membership bitmap 315 with the global cluster membership bitmap 305, lock 320 on the node is switched to true (block 500). If a thread is not able to access the lock (a determination of FALSE at block 500) it is possible that another thread has taken the lock and the process ends.

In some embodiments, if the thread is able to obtain the lock (a determination of TRUE at block 500), the update local cluster membership bitmap process reads the global cluster membership bitmap 305 from distributed global memory 138 and stores the content of the current global cluster membership bitmap 305 in a temporary bitmap identified herein as "tmp_bitmap" (block 505). As discussed in greater detail in connection with FIG. 6, when a node that is implementing the process of FIG. 5 is in a "joining" state, as indicated by the joining flag 325, the node will need to wait until all workload requests that were previously striped to the currently active nodes (before the node started the joining process) have completed processing, before the joining node is able to start accepting workload requests.

Accordingly, in some embodiments a determination is make as to whether the node is in a joining state (block 510). If the node is joining local.joining=true (a determination of True at block 510) the node removes itself from the temporary bitmap (block 515). This will prevent the joining node from appearing in its version of the local cluster membership bitmap 315 until the joining process has been completed. If the node is not joining: local.joining=false (a determination of False at block 510), or after the node has removed itself from the temporary bitmap (block 515) the content of the temporary bitmap is stored to the local cluster membership bitmap 315 (block 520). The lock is then released (block 525) and the process ends. By removing itself from its version of the local bitmap, if the joining node receives a workload request during the joining process, it will add the workload request to its local workload queue, run the striping algorithm on the workload request and determine that the workload request is not for itself. It will thus remove the workload request from its local workload queue and drop the workload request. This ensures that all previous workload requests that are active are drained/completed before the joining node begins working on work tasks.

Figure 6:
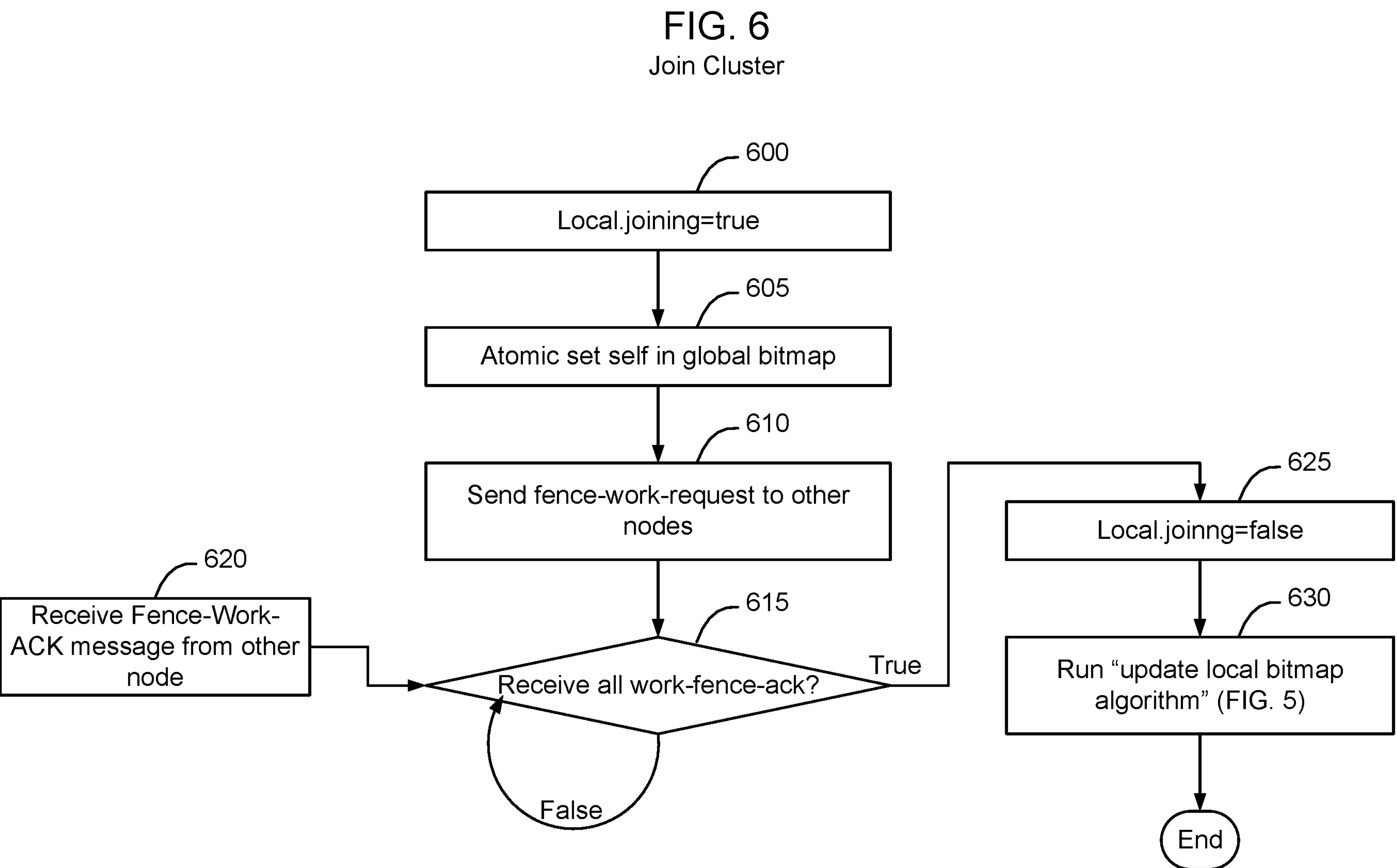
FIG. 6 is a flow chart of a process used by a node to join a cluster of nodes sharing workload tasks in a distributed join management process, according to some embodiments.

FIG. 6 is a flow chart of a process used by a node to join a cluster of nodes sharing workload tasks in a distributed join management process, according to some embodiments. As shown in FIG. 6, when a node is joining a cluster: local.joining=true (block 600) the node will implement an atomic set self in the global cluster membership bitmap 305 (block 605). This causes the bit associated with the node that is joining to be set in the global cluster membership bitmap 305, such that the global cluster membership information that is maintained using the global cluster membership bitmap 305 will reflect the updated cluster membership.

When a cluster is operating, and a node seeks to join the cluster, the current nodes in the cluster will have been assigning workload requests using the striping algorithm based on the previous node membership. To ensure that any outstanding previous requests that are active are drained/completed, in some embodiments the joining node sends a fence-work-request to each of the other nodes (block 610). The other nodes insert the fence work request into their local work queue and, once the other work ahead of the fence work request has been drained/completed, respond to the joining node with a fence work acknowledgment message (block 620). Additional details associated with processing fence work requests is discussed in connection with FIGS. 7 and 8.

While the joining node has not received fence work acknowledgment messages from all other nodes of the cluster (a determination of FALSE at block 615) the joining node waits. Once the joining node has received fence work acknowledgment messages from all other nodes of the cluster (a determination of TRUE at block 615) the joining node resets the joining flag 325 local.joining=false.

The joining node then runs the update local cluster membership bitmap algorithm of FIG. 5 a second time. When the joining node runs the update local cluster membership bitmap algorithm of FIG. 5 the second time, the update local cluster membership bitmap process will read the global cluster membership bitmap 305 and store the global cluster membership bitmap 305 into the temporary bitmap (block 505). Since the joining flag 325 is now set to false, a determination will be made at block 510 that the joining flag 325 is false, and the node will therefore not remove itself from the temporary bitmap. Accordingly, the node will set the local cluster membership bitmap=the global cluster membership bitmap (block 520) which the joining node caused to include a bit identifying the joining node as part of the cluster (block 605). Accordingly, the node has now joined the cluster and is able to process work requests. Since the fence work request caused all work requests that were previously distributed to the previous set of nodes to have been completed during the node joining process described in FIG. 6, enabling the node to join the cluster in this manner effectively prevents a scenario where a joining node could cause a particular workload request to be redundantly processed by two nodes of the workload cluster.

Figure 7:
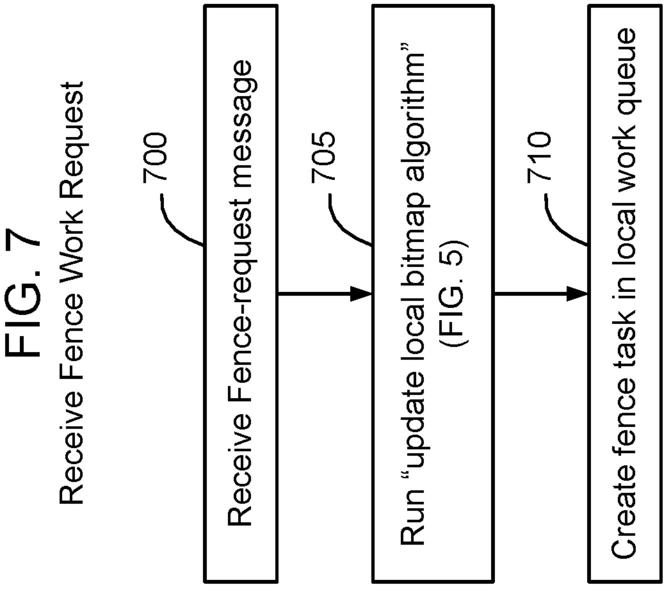
FIG. 7 is a flow chart of a process implemented by a node in response to receipt of a fence work request message from another node of the cluster of nodes as part of the distributed join management process, according to some embodiments.

FIG. 7 is a flow chart of a process implemented by a node in response to receipt of a fence work request message from another node of the cluster, according to some embodiments. As shown in FIG. 6, fence work requests are generated when a node is seeking to join a cluster (block 610) which means that the global cluster membership bitmap 305 has changed. Accordingly, when a node receives a fence workload request (block 700), the node will run the update local cluster membership bitmap algorithm of FIG. 5 to update its local cluster membership bitmap 315 (block 705). The node will also create a fence task in the local work queue 210, and add the fence work request to its local queue 210 (block 710).

Once a node updates its local cluster membership bitmap 315, this new bitmap will be used by the node in connection with running the striping algorithm. In some embodiments, as shown in FIG. 12, each node adds the workload request to its local queue and then runs the striping algorithm on each received workload request, to validate that the work is for itself. If the node calculates a different node for a particular work request, the workload request is removed from the local queue and the request is dropped. This ensures that any outstanding requests (or requests from nodes that have not yet received the fence request message) that should be striped to a different node are removed from the local workload queue and dropped, as the node is no longer the current owner. Then, the fence task is created to ensure that all in-progress work is finished.

This allows all created work tasks to proceed in parallel, even if the fence has not reached the head of the queue. In the case that a work request is dropped, the original node that sent the request will retry the request, which will rerun the striping algorithm and send the request to the correct location. Accordingly, once a fence workload request has been added to the local queue of a given node (for example as shown in FIG. 9B), the work items in the queue after the fence workload item are always safe to run because the node reruns the striping algorithm on each received work request to validate that the workload item is for itself after the workload item is added to the node's local workload queue.

This also enables the join request to be handled at different points in time by different nodes. For example, assume that there are four nodes in a cluster, and that node 1 is dead and wants to join. It sends a join request to nodes 2, 3, and 4. Node 2 processes the join request to create the fence job and updates its local striping bitmap. Node 3 sends a work request to node 2 (using the old bitmap), then node 3 processes the join request to update its bitmap to include node 1. Node 2 receives the work request from node 3. Then node 2 will add the workload request to its local queue after the fence job and will rerun the striping algorithm to see if this work request is for itself. When node 2 does this, it is using the new bitmap. If the work is for itself, it will process the workload request. In the case that the striping algorithm run by node 2 results in a determination that one of the other nodes should process the work request, (e.g., node 1, 3 or 4), then node 2 will remove the workload request from its local workload queue and drop the work request. Eventually the node 1 join process completes, all nodes are using a local bitmaps that include node 1, and node 1 can process work as well. In instances where a workload request is dropped, for example in the above example where the work request was sent by node 3 to node 2 and then dropped by node 2, node 3 will time out waiting for completion of the original work request. When node 3 times out, it will re-run the striping algorithm on the work request using the updated bitmap, and on retry will send the work request to the correct node, where it is processed as normal.

Figure 8:
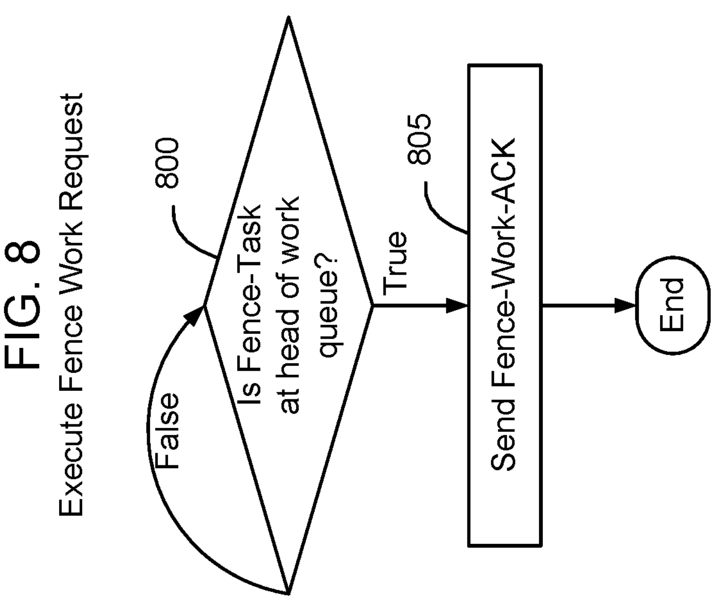
FIG. 8 is a flow chart of a process used by a node to process the fence work request message of FIG. 7, according to some embodiments.

FIG. 8 is a flow chart of a process used by a node to process the fence work request message of FIG. 7, according to some embodiments. The fence work request message is added to the local workload queue 205, but doesn't actually do any work. Rather, the node will continue processing other work requests that are contained in the local workload queue 210 ahead of the fence work request, until all work requests that were added to the local workload queue 210 before the fence work request have been processed. The fence work request task monitors to determine whether the fence task is at the head of the local workload queue (block 800). While the fence task determines that the fence work request is not at the head of the local workload queue (a determination of FALSE at block 800) the fence task waits. When the fence task determines that the fence work request is at the head of the local workload queue (a determination of TRUE at block 800) the fence task generates a fence work acknowledgment message (block 805) that is sent to the node that is joining the cluster (FIG. 6, block 620).

Figure 9C:
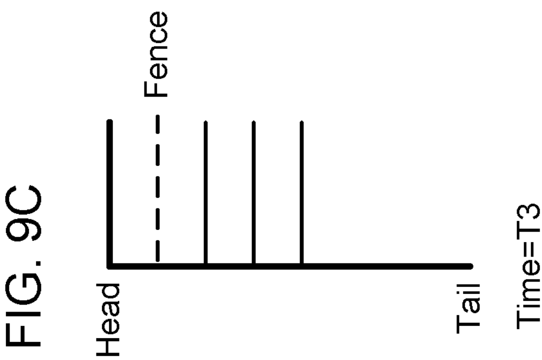
FIGS. 9A-9C are functional block diagrams of an example workload queue of one of the nodes showing the state of the workload queue at three points in time, according to some embodiments.
Figure 9B:
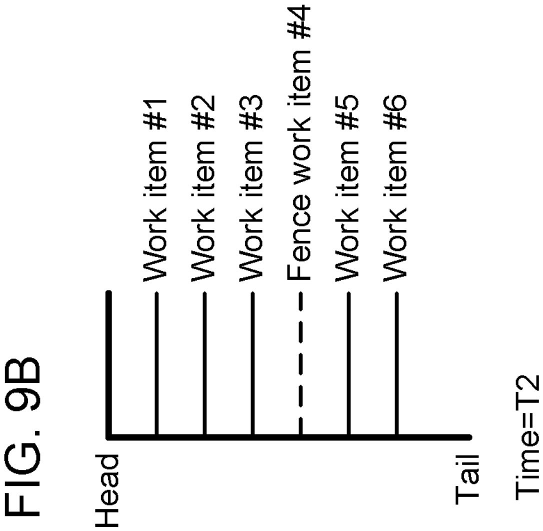
Figure 9A:
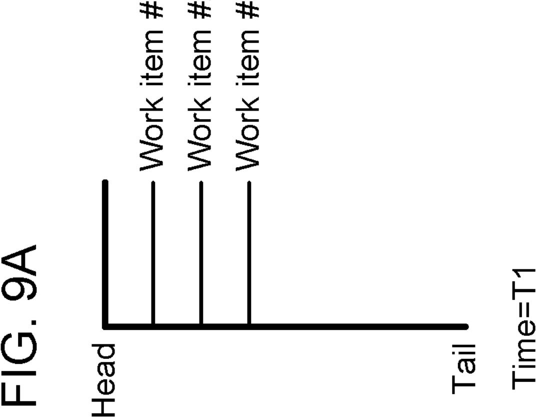

FIGS. 9A-9C are functional block diagrams of an example workload queue of one of the nodes showing the state of the workload queue at three points in time, Time=T1, Time=T2, and Time=T3, according to some embodiments. In some embodiments, each local workload queue 210 is implemented as a list of the running workload tasks. The workload queue has a head and a tail, similar to a First-In-First-Out queue, and new workload tasks are placed in the queue at the tail of the queue. The local workload queue 210 may be implemented, for example, using a double linked list data structure or other data structure. Although workload tasks are inserted into the queue at the tail of the local workload queue 210, in some embodiments the workload tasks can complete in any order.

FIG. 9A shows an example local workload queue 210 at a first point in time, and shows the example local workload queue 210 as containing three tasks—work item #1, work item #2, and work item #3. Work item #1 is at the head of the queue, and in this example work item #3 is at the tail of the local workload queue 210.

In FIG. 9B, a fence task has been added to the local workload queue 210 as work item #4. The fence task is shown using a dashed line in FIG. 9B. Additionally, two more workload tasks have been added to the local workload queue 210 in FIG. 9B—work item #5 and work item #6, both of which are behind the fence task in the local workload queue 210. The fence task was created after a joining-node added itself to the global cluster membership bitmap 305 and sent a work fence request to this node. The first three tasks (workload items #1-#3) in the local workload queue 210 of FIG. 9B were allocated (striped) to this node using the striping process of FIG. 4 using the old bitmap. These three tasks must finish before the joining-node can start processing work. Otherwise, the joining-node may attempt to do the same work. For example, if the striping algorithm initially attempted to stripe a particular task, such as work item #3 to the joining node, but wasn't able to do so because the node was not part of the cluster at that point in time, if the workload item is striped a second time using the new bitmap, it is possible that the particular task (work item #3) would be striped to the joining node using the new bitmap. However, since the joining node uses the old bitmap (without itself added) in the striping algorithm during the joining process, if the joining node receives any workload tasks before it has completed the joining process, it will add the workload requests to its local workload queue, run the striping algorithm to determine that it is not responsible for the workload tasks, and will then remove the workload tasks from its local workload queue and drop the workload tasks. By ensuring that the workload items that were striped using the previous version of the bitmap complete prior to enabling the joining node to process any work requests, it is possible to prevent more than one node from processing a given workload request.

The subsequent two tasks (workload items #5-#6) were striped to this node using the new bitmap. Accordingly, none of the subsequent tasks will be striped to the joining node. Specifically, since the subsequent tasks (workload items #5 and #6) were determined to be assigned to this node using the new map, and this node is not the joining node, if workload items #5 and #6 are re-striped, it would be expected that the workload items would consistently be re-striped back to the same node.

As shown in FIG. 9C, eventually all of the tasks that were created before the joining-node was added to the bitmap will complete processing. Once the fence task is at the head of the local workload queue 210 as shown in FIG. 9C, the node can now send a fence work acknowledgment message to the joining node, to allow it to proceed to complete the joining process (FIG. 6, blocks 625-630).

Figure 10:
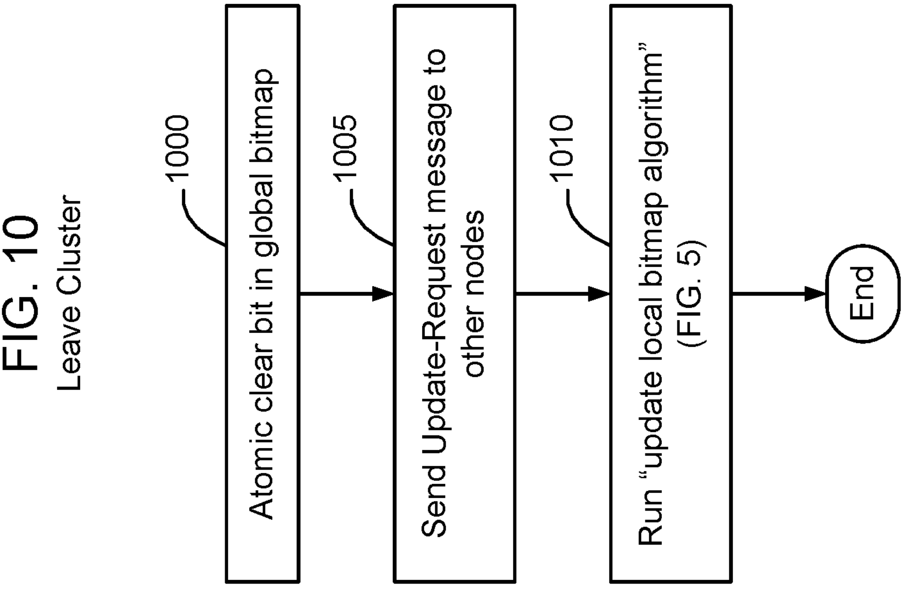
FIG. 10 is a flow chart of a process used by a node to leave a cluster of nodes sharing workload tasks, according to some embodiments.

FIG. 10 is a flow chart of a process used by a node to leave a cluster of nodes sharing workload tasks, according to some embodiments. The process shown in FIG. 10 may be used, for example, in instances where a node decides to leave a cluster, for example in connection with performing maintenance on the node, where a node declares itself dead, where a watchdog declares a node to be dead, or in other situations where a node might leave a cluster. In some embodiments, any node can implement the process shown in FIG. 10 on its own or can implement the process shown in FIG. 10 on behalf of any other node in the cluster.

As shown in FIG. 10, in some embodiments when a node leaves the cluster, an atomic clear bit operation will be implemented on the global cluster membership bitmap 305 (block 1000). This resets the bit for the node in the global cluster membership bitmap 305. The node that implemented the atomic clear bit operation sends an update request message to all of the remaining nodes of the cluster (block 1005). The node that implemented the atomic reset operation for the node that is leaving the cluster will also implement an update local cluster membership bitmap algorithm of FIG. 5 to update its local cluster membership bitmap 315 based on the new global cluster membership bitmap 305 (block 1010).

Figure 11:
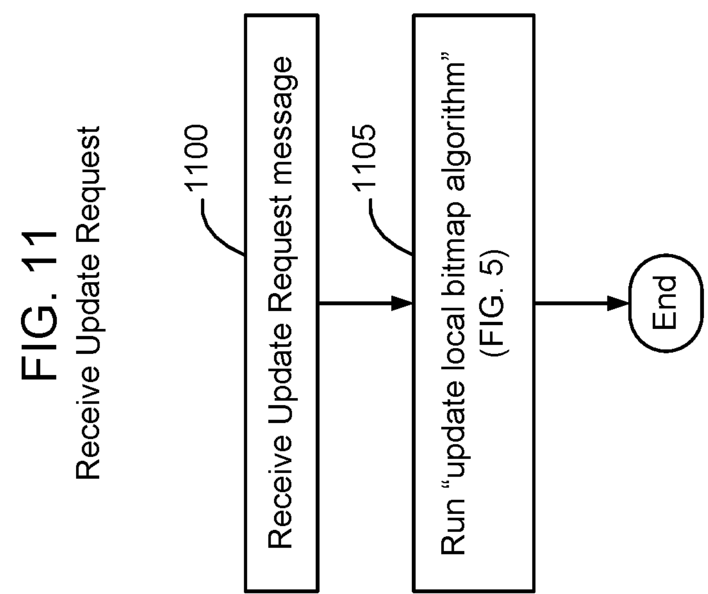
FIG. 11 is a flow chart of a process used by a node in response to receipt of an update request message from another node of the cluster of nodes sharing workload tasks, according to some embodiments.

FIG. 11 is a flow chart of a process used by a node in response to receipt of an update request message from another node of the cluster, according to some embodiments. An update request message is a message from one node of the cluster to another node of the cluster requesting that the node update its local cluster membership bitmap 315. Update request messages may be generated whenever one node knows that a change has occurred to the global cluster membership bitmap 305. For example, as shown in FIG. 10, when a node implements an atomic operation to reset a bit of one of the nodes in the global cluster membership bitmap 305 (block 1000), the node will send an update request message to the other nodes of the cluster (block 1010). As another example, in some embodiments a node might be configured to periodically automatically perform a synchronization process to refresh their local cluster membership bitmap 315.

When a node receives an update request message (block 1100), the node runs the update local cluster membership bitmap algorithm of FIG. 5 (block 1105). This causes the local cluster membership bitmap 315 of the node to be updated to the current version of the global cluster membership bitmap 305 to enable all nodes of the cluster to remain synchronized, such that all nodes of the cluster use the current version of the global cluster membership bitmap 305 when striping work requests within the cluster.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of implementing a distributed cluster join management process in a cluster of two or more nodes configured to share workload tasks, comprising:

maintaining global cluster membership information in shared memory accessible to each of the nodes of the cluster;

maintaining a local copy of the global cluster membership information in local memory resources by each of the nodes;

implementing a striping process by each of the nodes of the cluster, using respective local copies of the global cluster management information, to deterministically distribute the workload tasks between the nodes of the cluster;

initiating a cluster joining process by a first node seeking to become active in the cluster, wherein initiating the cluster joining process by the first node comprises:

transmitting a fence work request by the first node to each other node of the cluster;

updating the global cluster membership information to identify the first node as active in the cluster;

downloading a first local copy of the updated global cluster membership information to the first node; and after downloading the first local copy of the updated global cluster membership information to the first node, modifying the first local copy of the updated global cluster membership information by the first node to create a modified local copy of the updated global cluster membership information, the modified local copy of the updated global membership information identifying the first node as not being active in the cluster to prevent the first node from processing any of the workload tasks until after completing the cluster joining process; and waiting for receipt of fence work complete acknowledgment messages by the first node from each other node of the cluster; and in response to receiving the fence work complete acknowledgment message from each of the other nodes of the cluster, completing the cluster joining process by the first node, wherein completing the cluster joining process by the first node comprises downloading a second local copy of the updated global cluster membership information to the first node.

2. The method of claim 1, further comprising using the modified local copy of the updated global cluster membership information, by the first node during the cluster joining process, to prevent the first node from processing any of the workload tasks until after the first node has completed the cluster joining process.

3. The method of claim 1, wherein completing the cluster joining process by the first node comprises downloading the second local copy of the updated global cluster membership information to the first node without modifying the second local copy of the updated global cluster membership information on the first node.

4. The method of claim 1, wherein each of the nodes maintains a local workload queue; and wherein implementing the striping process, by each of the nodes, is performed by each of the nodes on each received workload task after accepting a respective workload task into its local workload queue.

5. The method of claim 4, wherein implementing the striping process for a given workload task by a receiving node comprises determining by the receiving node if the receiving node is responsible for the workload task;

in response to a determination that the receiving node is responsible for the given workload task, keeping the given workload task in the receiving node's local workload queue for subsequent processing; and in response to a determination that the receiving node is not responsible for the given workload task, removing the given workload task from the node's local workload queue and forwarding the given workload task to another node of the cluster identified by the striping process as being responsible for the given workload task.

6. The method of claim 4, wherein implementing the striping process for a given workload task by a receiving node comprises determining by the receiving node if the receiving node is responsible for the workload task;

in response to a determination that the receiving node is responsible for the given workload task, keeping the given workload task in the receiving node's local workload queue for subsequent processing; and in response to a determination that the receiving node is not responsible for the given workload task, removing the given workload task from the node's local workload queue and dropping the given workload task.

7. The method of claim 1, further comprising determining, by a first of the nodes of the cluster, that a second of the nodes of the cluster should be identified as not active in the cluster;

updating the global cluster membership information to identify the second of the nodes as not being active in the cluster; and sending a request by the first of the nodes to all other active nodes of the cluster to instruct the other active nodes of the cluster to update their local copy of the global cluster membership information.

8. The method of claim 1, wherein maintaining the local copy of the global cluster membership information comprises downloading a copy of the global cluster membership information from the shared memory.

9. The method of claim 1, wherein workload tasks are stored maintained by each node in a respective workload queue, and wherein implementing the fence work request by each of the other nodes comprises implementing all workload tasks that were entered into the respective workload queue before receipt of the fence work request.

10. A method of implementing a distributed cluster join management process in a cluster of two or more nodes configured to share workload tasks, comprising:

maintaining global cluster membership information in shared memory accessible to each of the nodes of the cluster;

maintaining a local copy of the global cluster membership information in local memory resources by each of the nodes;

implementing a striping process by each of the nodes of the cluster, using respective local copies of the global cluster management information, to deterministically distribute the workload tasks between the nodes of the cluster;

initiating a cluster joining process by a first node seeking to become active in the cluster;

in response to initiating the cluster joining process by the first node:

generating a fence work request by the first node;

transmitting the fence work request by the first node to each of other nodes of the cluster;

implementing the fence work request by each of the other nodes of the cluster; and transmitting a fence work complete acknowledgment message by each of the other nodes of the cluster to the first node; and in response to receiving the fence work complete acknowledgment message from each of the other nodes of the cluster, completing the cluster joining process by the first node;

wherein the first node is prevented from processing any of the workload tasks until after completing the cluster joining process; and wherein the striping process is configured to initially determine which node of the cluster should be responsible for processing a particular workload task, use the local copy of the global cluster membership information to determine if the determined node is active in the cluster, and where the determined node is identified as not being active in the cluster, determine an alternative node of the cluster that should be responsible for processing the particular workload task.

11. A cluster of two or more nodes configured to share workload tasks, each node being implemented by one or more computers and one or more storage devices storing instructions that are operable, when executed by the one or more computers, to cause the one or more computers to perform a distributed cluster join management process comprising:

maintaining global cluster membership information in shared memory accessible to each of the nodes of the cluster;

maintaining a local copy of the global cluster membership information in local memory resources by each of the nodes;

implementing a striping process by each of the nodes of the cluster, using respective local copies of the global cluster management information, to deterministically distribute the workload tasks between the nodes of the cluster;

initiating a cluster joining process by a first node seeking to become active in the cluster;

in response to initiating the cluster joining process by the first node:

generating a fence work request by the first node;

transmitting the fence work request by the first node to each of the other nodes of the cluster;

implementing the fence work request by each of the other nodes of the cluster; and transmitting a fence work complete acknowledgment message by each of the other nodes of the cluster to the first node; and in response to receiving the fence work complete acknowledgment message from each of the other nodes of the cluster, completing the cluster joining process by the first node;

wherein the first node is prevented from processing any of the workload tasks until after completing the cluster joining process;

wherein each node maintains a local workload queue; and wherein implementing the striping process, by each node, is performed by each node on each received workload task after accepting a respective workload task into its local workload queue.

12. The cluster of two or more nodes of claim 11, wherein initiating the cluster joining process by the first node comprises:

updating the global cluster membership information to identify the first node as active in the cluster; and after downloading a first local copy of the updated global cluster membership information to the first node, modifying the first local copy of the updated global cluster membership information on the first node to create a modified local copy of the updated global cluster membership information, the modified local copy of the updated global membership information identify the first node as not being active in the cluster.

13. The cluster of two or more nodes of claim 12, further comprising using the modified local copy of the updated global cluster membership information, by the first node during the cluster joining process, to prevent the first node from processing any of the workload tasks until after the first node has completed the cluster joining process.

14. The cluster of two or more nodes of claim 12, wherein completing the cluster joining process by the first node comprises downloading a second local copy of the updated global cluster membership information to the first node without modifying the second local copy of the updated global cluster membership information on the first node.

15. The cluster of two or more nodes of claim 11, wherein implementing the striping process for a given workload task by a receiving node comprises determining by the receiving node if the receiving node is responsible for the workload task;

in response to a determination that the receiving node is responsible for the given workload task, keeping the given workload task in the receiving node's local workload queue for subsequent processing; and in response to a determination that the receiving node is not responsible for the given workload task, removing the given workload task from the node's local workload queue and forwarding the given workload task to another node of the cluster identified by the striping process as being responsible for the given workload task.

16. The cluster of two or more nodes of claim 11, wherein implementing the striping process for a given workload task by a receiving node comprises determining by the receiving node if the receiving node is responsible for the workload task;

in response to a determination that the receiving node is responsible for the given workload task, keeping the given workload task in the receiving node's local workload queue for subsequent processing; and in response to a determination that the receiving node is not responsible for the given workload task, removing the given workload task from the node's local workload queue and dropping the given workload task.

17. The cluster of two or more nodes of claim 11, further comprising determining, by a first of the nodes of the cluster, that a second of the nodes of the cluster should be identified as not active in the cluster;

updating the global cluster membership information to identify the second of the nodes as not being active in the cluster; and sending a request by the first of the nodes to all other active nodes of the cluster to instruct the other active nodes of the cluster to update their local copy of the global cluster membership information.

18. The cluster of two or more nodes of claim 11, wherein maintaining the local copy of the global cluster membership information comprises downloading a copy of the global cluster membership information from the shared memory.

19. The cluster of two or more nodes of claim 11, wherein the striping process is configured to initially determine which node of the cluster should be responsible for processing a particular workload task, use the local copy of the global cluster membership information to determine if the determined node is active in the cluster, and where the determined node is identified as not being active in the cluster, determine an alternative node of the cluster that should be responsible for processing the particular workload task.

20. The cluster of two or more nodes of claim 11, wherein workload tasks are stored maintained by each node in a respective workload queue, and wherein implementing the fence work request by each of the other nodes comprises implementing all workload tasks that were entered into the respective workload queue before receipt of the fence work request.

* * * * *